May 3, 1960
E. N. POULOS
2,934,889
NOISE ABATEMENT MEANS
Filed Feb. 14, 1956
3 Sheets-Sheet 1
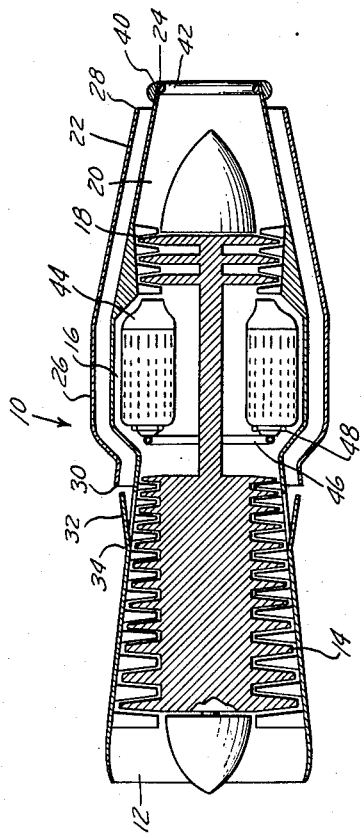
FIG._1
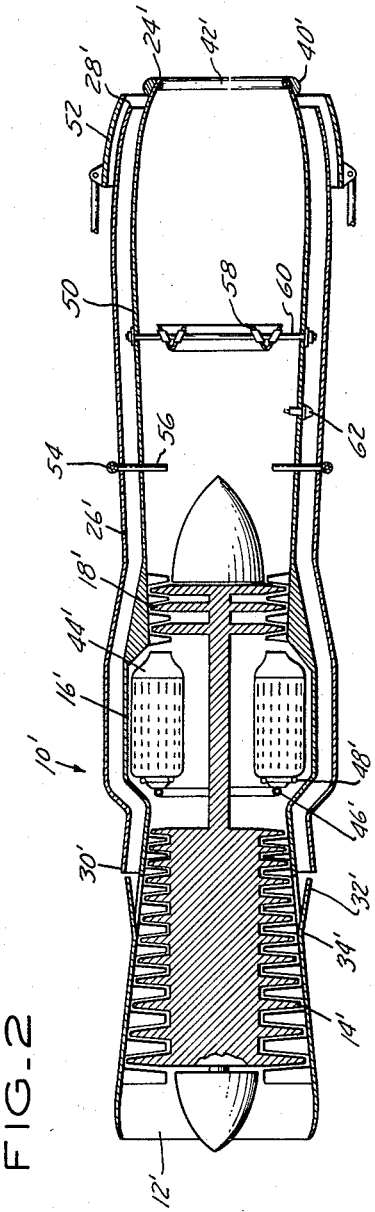
FIG._2
INVENTOR
ERNEST N. POULOS
BY *Vernon F. Hauschild*
ATTORNEY May 3, 1960  E. N. POULOS  2,934,889
NOISE ABATEMENT MEANS
Filed Feb. 14, 1956  3 Sheets-Sheet 2
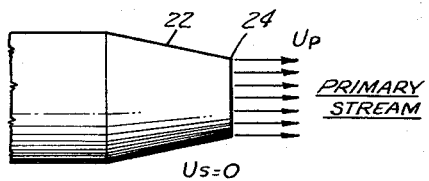
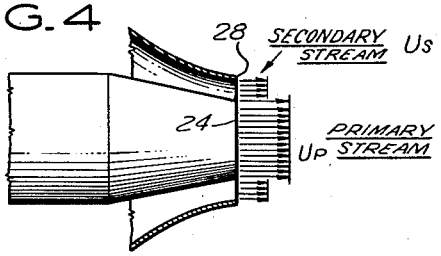
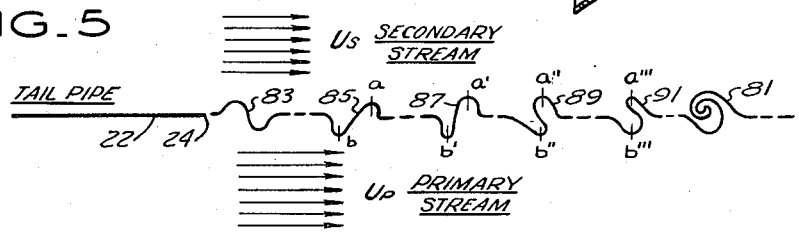
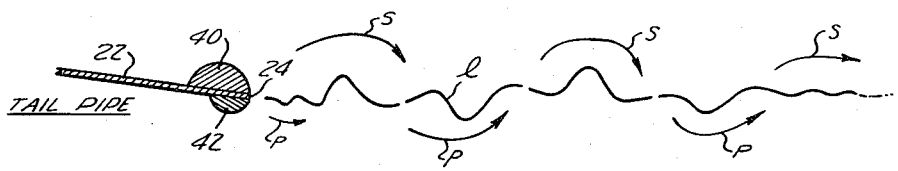
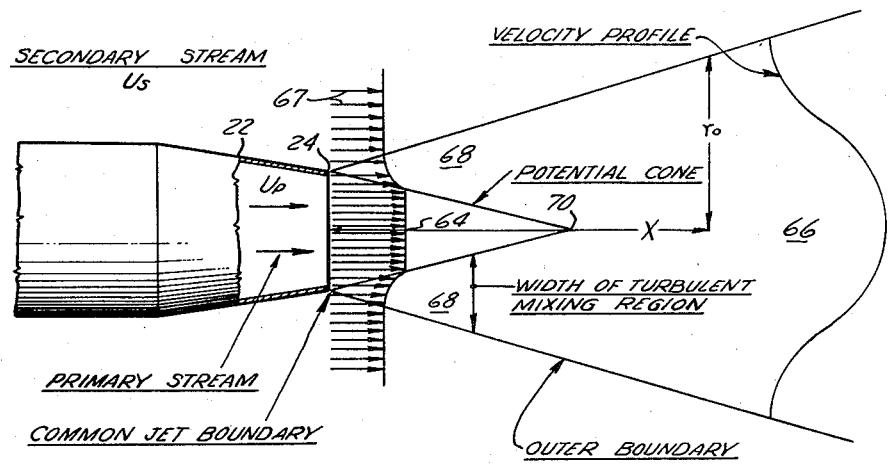
INVENTOR
ERNEST N. POULOS
BY Vernon F. Hauschild
ATTORNEY May 3, 1960  E. N. POULOS  2,934,889
NOISE ABATEMENT MEANS
Filed Feb. 14, 1956  3 Sheets-Sheet 3
FIG_8
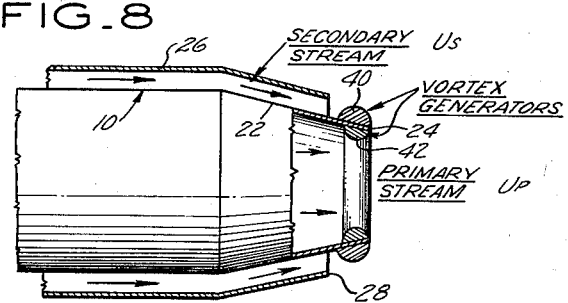
FIG_9
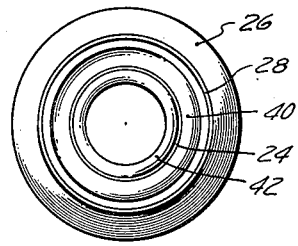
FIG_10
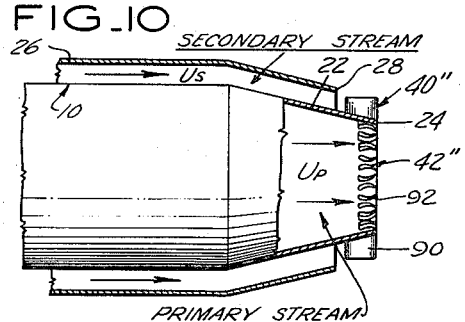
FIG_11
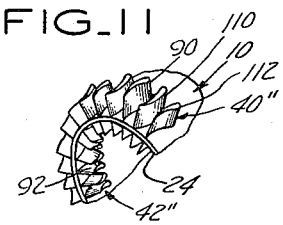
FIG_15
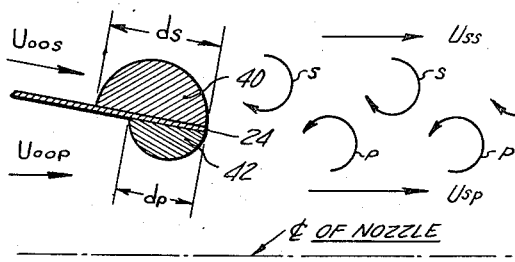
FIG_13
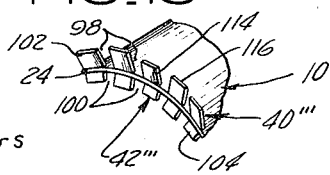
FIG_14
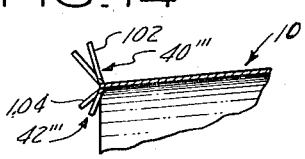
FIG_16
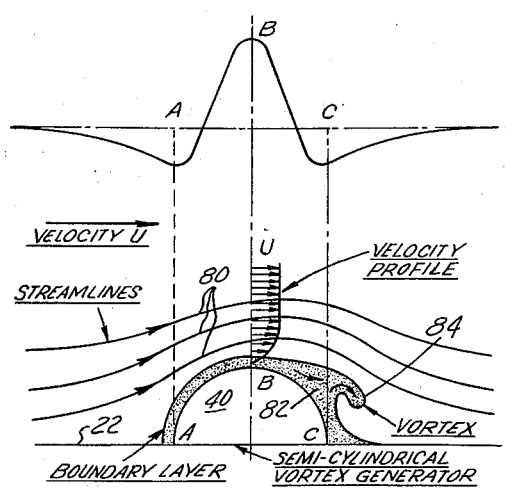
FIG_17
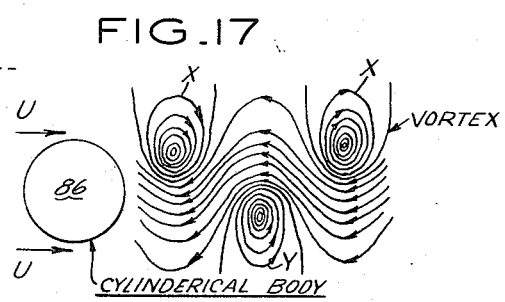
INVENTOR
ERNEST N. POULOS
BY Vernon F. Hauschild
ATTORNEY

United States Patent Office 2,934,889
Patented May 3, 1960

2,934,889

NOISE ABATEMENT MEANS

Ernest N. Poulos, Boston, Mass., assignor to United Aircraft Corporation, East Hartford, Conn., a corporation of Delaware Application February 14, 1956, Serial No. 565,499

3 Claims. (Cl. 60—35.6)

This invention relates to noise abatement means and more particularly to the abatement of the noise generated by the exhaust or jet stream of a jet engine.

It is the primary object of my invention to effect the abatement of noise generated by the exhaust of a jet engine by providing vortex generators which will be used in combination with the primary and secondary gas or air streams of the engine to induce vortices of opposite rotation and phase to accomplish a noise cancellation function.

It is a further object of this invention to control the formation of burbles in the jet exhaust downstream of the engine, thereby reducing the noise intensity generated by the conversion of thermal energy into acoustical energy in the jet wake.

It is a further object of this invention to diminish the shear effect in the immediate jet exhaust area caused by the velocity gradient between the exhaust gas and ambient air.

It is still a further object of the present invention to cause turbulence in the immediate jet engine exhaust area so as to diminish engine exhaust gas temperature as much as possible to reduce the amount of thermal energy which remains to be converted into acoustical energy.

It is still a further object of this invention to provide a stationary and permanent vortex street downstream of a jet engine for several engine diameters to serve as a substantially cylindrical wall of acoustic energy through which the acoustic energy of the jet exhaust will not penetrate since the intensity, phase, and rotation of the vortices in the vortex street is such that it will cancel the acoustic energy from the jet stream which attempts to penetrate through the vortex street.

It is still a further object of the present invention to provide noise abatement means for use with a jet engine which means is light in weight, simple in construction, and not injurious to the thrust generated by the jet engine.

It is still a further object of the present invention to provide noise abatement means for use with an aircraft jet engine which is effective both during flight operation and ground operation of the airplane being powered by the jet engine.

Although applicant chooses to show his invention as used in connection with the exhaust noises generated by an aircraft engine, it should be understood that the invention is applicable to any type of exhaust noise and is not limited solely to jet engine exhaust noises.

I show several figures of drawings to illustrate my invention and, by way of description, the drawings are:

Fig. 1 is a cross-sectional view of a jet engine with a tail pipe incorporating my invention.

Fig. 2 is a cross-sectional view of my invention on a jet engine having an afterburner incorporating my invention.

Fig. 3 shows a typical convergent exhaust duct with a flat velocity profile of the exhaust gases.

Fig. 4 is a view of a typical convergent exhaust duct enveloped by or enclosed within an encircling coaxial shroud, and shows the velocity profile which exists between the primary stream and the secondary stream.

Fig. 5 shows a representation of a jet exhaust burble formation due to the velocity differential between the primary and secondary streams.

Fig. 6 demonstrates the acoustic cancelling effect which the vortex street generated by my invention will have upon the formation of the jet exhaust burbles.

Fig. 7 is a nomenclature diagram and demonstrates the regions in the exhaust wake which are primarily concerned with noise generation.

Fig. 8 shows a preferred embodiment of my invention in which semicircular vortex generators are placed on both the outer and inner periphery of the primary exhaust duct.

Fig. 9 is the rear view of the configuration shown in Fig. 8.

Fig. 10 shows a variation of my invention in which the vortex generators are airfoil shaped in cross section and extend radially from the exhaust outlet of the primary exhaust duct.

Fig. 11 is a perspective view of the embodiment shown in Fig. 10.

Fig. 12 is a view of a variation of my invention using vortex generators of a tear or airfoil shape.

Fig. 13 is a variation of my invention in which the vortex generators consist of either a single radially projecting flange or a plurality of radially projecting flange sections which have slight circumferential space so as to permit the formation of both radially and circumferentially rotating vortices.

Fig. 14 is a cross-sectional view of the configuration shown in Fig. 13.

Fig. 15 is a representation of the vortex street generated by the vortex generators of my invention.

Fig. 16 is a representation of the formation of a vortex by a semicircular vortex generator.

Fig. 17 is a representation of a plurality of standing and stationary spaced vortices formed by the passing of air or gas over a cylindrical body.

As the modern aircraft industry progressively develops larger and more powerful jet engines, the problem of noise control and abatement in the neighborhood of airports and other establishments becomes of great importance. The efforts of the industry to date have produced only noise abatement means which are heavy in construction, inefficient in operation, and injurious to the thrust generated by the jet engine in normal operation. Applicant has devised a noise abatement scheme which is able to abate the noise of a jet engine exhaust, which is simple in construction, light in weight, and which does not adversely affect the thrust generated by the jet engine in operation.

For illustration purposes, I shall begin by describing a preferred embodiment of my invention, and will follow this description with an "Explanation of Operation."

Referring to Fig. 1, we see an aircraft jet engine 10 having air inlet section 12, compressor section 14, combustion chamber section 17, turbine section 18, and jet exhaust section, 20. The exhaust gases pass through tail pipe 22 and thence out tail pipe exhaust outlet 24 into atmosphere. Shroud 26, which is preferably made of sheet metal, surrounds and envelops a portion of the jet engine 10 and is coaxial with engine 10 and tail pipe 22 and has an exhaust outlet 28 which is located a short distance upstream of exhaust outlet 24 of tail pipe 22. Shroud 26 may either be specially added to an airplane engine installation or the function served by shroud 26 may be performed by the airplane nacelle into which the engine 10 is placed. It will be noted that shroud 26 is open at its forward end 30 so that air or gas may pass through the passage formed between shroud 26 and engine 10 so as to form a secondary gas or air stream external of the engine gas stream which will be referred to as the primary stream. It is obvious that if the airplane nacelle provides this secondary stream forming means, shroud 26 as a separate piece will not be necessary. Ram air will form the secondary stream during flight operation and it will be noted that a plurality of flaps 32, pivoted at their forward end 34 and placed in the wall of the compressor section 14 of engine 10, may be pivoted outwardly so as to bleed a certain portion of the pressurized compressor air out into the nacelle or shroud 26 so as to form a secondary stream during immobile ground operation of the airplane. It will be noted that a vortex generator 40 is placed at the outer periphery of exhaust outlet 24 of tail pipe 22 and that a second vortex generator 42 is placed at the inner periphery of exhaust outlet 24 of tail pipe 22. Vortices moving in a radially inward rotational direction will be formed by the secondary stream passing over vortex generator 40 while vortices of opposite direction and phase will be formed by the primary air passing over vortex generators 42.

The aircraft engine shown in Fig. 1 is of a well-known type in which air enters inlet 12, is compressed in compressor section 14, is heated as it passes through combustion chamber 16 due to the combustion which is being supported in combustion chambers 44 by the passage of air therethrough and the introduction of fuel thereto from fuel manifold 46 and fuel nozzles 48. The gas so heated will then pass through turbine section 18 in a power generating function to drive compressor 14 and also to discharge hot exhaust gases as a jet exhaust through exhaust outlet 24 of tail pipe 22.

Fig. 2 shows a jet engine 10' which has inlet section 12', compressor section 14', combustion chamber section 16', turbine section 18', and afterburner 50. Afterburner 50 has exhaust nozzle 52 associated with its downstream end, which exhaust nozzle is of any well-known type and probably consists of a plurality of overlapping flaps which may be directed inwardly so as to form a small opening during nonafterburner operation and outwardly so as to form a large opening during afterburner operation. Fuel will be injected into afterburner 50 through afterburner fuel manifold 54 thence through fuel spray bars 56. Combustion is supported within the afterburner 50 due to the static condition formed downstream of flameholders 58, which are supported by support bars 60. Shroud 26' encircles and encloses a portion of engine 10' and is coaxial with engine 10' and afterburner 50. Ram air may be passed through its open forward end 30 to form a secondary stream with engine 10' while the primary stream is passed through engine 10' or flaps 32' may bleed compressor air to perform this function as described above.

In operation, air enters engine inlet 12' and is compressed in compressor 14' and is then heated in combustion chamber 16' by combustion chambers 44' due to combustion supported therein, caused by air passing therethrough and the ignition of fuel which enters through fuel manifold 46' and fuel nozzles 48'. The heated gas then passes through turbine 18' in a power generating function to drive compressor 14' and thence passes through afterburner 50 where a reheat cycle occurs. Fuel from afterburner manifold 54 enters the afterburner through perforated fuel spray bars 56 and is ignited by any well-known means, possibly spark plug 62, and combustion is supported in the afterburner in the stagnant area formed downstream of flameholder 58. The jet effect is accomplished by liberating this heated and energized gas through exhaust outlet 24' of afterburner 50. It will be noted that exhaust outlet 28' of shroud 26' is located a short distance upstream of exhaust outlet 24' of afterburner 50. Vortex generators 40' are placed at the outer periphery of exhaust outlet 24' of afterburner 50 and a second vortex generator 42' is placed in the inner periphery of exhaust outlet 24' of afterburner 50.

Because there are so many forms of nacelles into which the engine may be placed in an airplane and, further, because there are so many types of exhaust nozzles, it will be obvious that it is necessary in each installation to determine where the vortex generators should be placed in an afterburner engine. The nacelle contour may be used in combination with the outer periphery of engine 10' to form the passage for the secondary stream and therefore, shroud 26', if a separate part, will not be necessary. Further, since the heart of applicant's invention lies in the utilization of vortex generators placed in a primary and secondary stream so as to form a stable vortex street so as to cancel the acoustic energy from the jet exhaust which attempts to penetrate it by means of sound wave cancellation, in certain installations it may be desirable to place the vortex generators on either the afterburner exhaust outlet or on the exhaust nozzle or on other available construction, any of which will be acceptable, so long as the primary and secondary streams are able to generate the vortex streets due to passage over the vortex generators which are placed in the primary and secondary streams.

*Explanation of operation*

It is pretty well accepted today that the noise generated by a jet engine comes from three principal sources. The first is the noise produced by the jet exhaust, the second is the noise produced at the engine air intake and the third is the noise produced from within the jet engine interior. It has been shown that the noise generated by the last two sources is a substantial number of decibles lower than the noise generated by the jet engine exhaust, which is a noise completely external of the engine per se. In view of this, applicant has devoted his efforts solely to the reduction of the noise external of the engine caused by the jet exhaust. The principal source of jet engine noise is considered to be due to the turbulent mixing of the exhaust of the jet engine with the ambient air in the jet engine exhaust region.

Contemporary scientists in the United States and England (Professor M. J. Lighthill) agree that the noise generated by the exhaust of a gas turbine or jet engine is produced subsonically, by a field of acoustic quadruples, giving rise to noise increasing roughly as the 8th power of the velocity of the exhaust gas. The high frequency noise is accepted as coming from the high velocity shear and turbulence at the outer periphery of the jet in the immediate vicinity of the nozzle and the low frequency noise coming from the large burbles which are formed further downstream in the jet exhaust as the thermal energy of the exhaust is converted into acoustical energy. It is accepted that the last of the energy convertible into acoustic energy has been dissipated any place from 10 to 15 diameters downstream of the engine exhaust outlet and that the greatest degree of turbulence, and therefore, noise generation, occurs in the region from two to six engine diameters downstream of the engine exhaust outlet.

With reference to the turbulent mixing mentioned above, Fig. 7 is provided to demonstrate activities of turbulence in the jet exhaust. There are three regions in the exhaust jet stream which are considered to be of major importance. The first of these is the central core of the jet where the velocity profile is flat and the intensity of the pressure fluctuations is low. This region is indicated at 64 in Fig. 7.

The next region is located several jet engine diameters downstream of the nozzle in which region the central core has disappeared and high turbulence prevails. This is shown in region 66. The third region of high turbulence exists in the mixing region between the central core region 64 and the moving medium such as the secondary stream 67, in which rather a large velocity gradient exists along the high intensity turbulence. This third region is shown in area 68. It will be noted from Fig. 7 that the primary stream being ejected from tail pipe 22 presents an initial constant or flat profile velocity but this central core gradually disintegrated until its is completely dissipated at approximately 70. This core forms the potential cone shown. It will be obvious from the difference in velocity arrow lengths of the primary and secondary streams that a shear effect due to this velocity gradient is caused commencing at the common jet boundary (shown). The velocity profile shown at the far right of Fig. 7 occurs several diameters downstream of common jet boundary or tail pipe exhaust outlet 24 and eventually, at a point even further downstream, a steady state occurs.

Turbulent mixing which is accepted as the primary source of subsonic noise generated aerodynamically starts at the common boundary of the jet exhaust and the stagnant or moving receiving medium, either the atmosphere or the secondary stream. The width of the turbulent mixing zone increases rapidly with distance downstream of the exhaust outlet 24 affecting a progressive interchange of properties between the coaxial primary and secondary streams. In this region, the velocity and momentum transfer and other stream properties such as chemical composition, density, and temperature, which may differ in the two streams, will be transferred bodily from one stream to the other by large scale eddies. If, as is the usual case, the velocity of the primary stream $U_p$ is greater than the velocity of the secondary stream $U_s$, the primary velocity will be decreased with distance downstream of exhaust outlet 24 while simultaneously a large portion of the secondary stream will be accelerated due to contact with the primary airstream. In the central region of the primary stream an undistributed velocity core or potential cone persists for several jet diameters downstream of exhaust outlet 24. This potential cone, which has full exhaust velocity, narrows with the distance from the exhaust outlet 24 and fades out completely at a distance of about six jet engine diameters downstream of the engine. From this point, the velocity of the jet exhaust gases along the axis common with the axis of the engine decreases and the flow pattern finally reaches a quasi-steady state in which all velocity profiles become similar. As the velocity decreases, the formation and size of the jet exhaust burbles or eddies increases.

An additional factor affecting turbulent mixing is a high temperature difference between the tail pipe 22 and the temperature of the gas passing through the tail pipe. This temperature differential sets up a heat flux across the tail pipe and causes a laminar tail pipe boundary layer, due to temperature effects and produces a turbulent or oscillating aerodynamic zone upstream of exhaust outlet 24. This temperature effect, called "tripping" causes an oscillation or movement or turbulence to be set up in the outer boundary layer within the tail pipe 22, which turbulence carries through exhaust outlet 24 and into the primary stream. A further initial turbulence or movement is caused by the gases passing through the rotating blading in the jet engine 10. It will therefore be obvious that the width of the initial turbulent mixing region is not only determined by the shear forces at the common jet boundary due to velocity differential between the primary stream, the secondary stream, and atmosphere; but also by the width and nature of the wall boundary turbulence zone just described, caused by both temperature effect and blade rotation.

Experiments to date indicate that the shear effect caused by the velocity differential between the primary stream and receiving medium, the atmosphere, has a substantial effect upon supersonic acoustical noises but does not have as important an effect upon the subsonic noises which are caused by the turbulent mixing some diameters downstream of the jet engine such as in area 66 of Fig. 7. This may be illustrated to some extent by observing Fig. 3 in which a flat profile velocity is shown by velocity vector arrows being discharged from tail pipe 22. It will be obvious that the velocity gradient between the primary stream and the atmosphere is the velocity of the primary stream. Experiments conducted to date of the type demonstrated in Fig. 4 in which a secondary stream was passed externally of the primary stream at velocity $U_s$ and $U_p$, respectively, the former being substantially one-half the latter so as to "bridge" the velocity gradient between $U_p$ and atmosphere, proved to be effectual with respect to supersonic noises but of no substantial effect with respect to subsonic noises. This experiment leads to the conclusion that the bulk of the jet engine exhaust noise of the subsonic variety, which is the variety of annoyance to persons, is caused primarily at the area of moximum turbulence several diameters downstream of exhaust outlet 24. While this velocity gradient is not of great importance in the formation of subsonic noises due to its "shear" effect, as described above, it is of definite importance in the formation of the large burbles and eddies several jet diameters downstream. This will be described later.

Experiment has shown that the rate of spreading of the mixing region increases with distance downstream from the exhaust outlet 24 and decreases with increasing velocity ratio between the primary and secondary streams. The rate of spreading may be expressed as $r_o \sim x^{1-\lambda}$ where $x$ is the distance from the exhaust outlet 24 (see Fig. 7), $r_o$ is the radial distance from the axis of the jet stream to the outer boundary of the mixing region and $\lambda$ is the velocity ratio between the primary stream ($U_p$) and the secondary stream ($U_s$).

The formation of burbles and eddies in the immediate vicinity of the exhaust outlet 24 of tail pipe 22 and their rotation and their increase in size and intensity as they travel downstream can be described by reference to Fig. 5. Fig. 5 shows secondary stream and primary stream of relative velocities $U_s$ and $U_p$. The combination of these relative velocities or "shear" effect and the oscillation or movement or initial turbulence, caused by temperature effect and blade rotation, already described, combine to form these large burbles, the initial one of which is shown at 81 in Fig. 5. By referring to Fig. 5, we see tail pipe 22 and exhaust outlet 24 through which the primary jet stream is emanated at velocity $U_p$. The secondary stream outboard of tail pipe 22 is shown to be at velocity $U_s$. The initial turbulence caused by the heat flux and blade rotation, just described, is indicated by fluctuation 83 and eventually by fluctuation 85. For purposes of illustration, we will follow point $a$ and point $b$ on the turbulence line commencing with turbulence wave 85. The relative velocity between the primary stream and the secondary stream is such that point $b$ gains upon point $a$ in their downstream movement such that at turbulence point 87, we see their relative positions at $a'$ and $b'$. This difference of velocity continues into turbulence point 89 such that their relative positions are now shown at $a''$ and $b''$. At turbulence point 91, we see that point $a'''$ is now well behind point $b'''$ and a torque type motion caused by the unbalance of the viscous and pressure forces causes the wave of turbulence to curl back upon itself and actually start rotary turbulence as shown at point 81 which is the first burble or eddy formed in the jet exhaust. The above described eddy or burble or fluid ball will have its own individual motion. When superimposed on the flow of the primary stream and the secondary stream, this motion causes the velocity and pressure between the streams to fluctuate irregularly at high frequency in the direction of gas flow and at right angles to it. Such fluid balls, or burbles, or vortices agglomerate and disintegrate further downstream of the exhaust outlet 24 and their size determines the amplitude of turbulence.

The size of each burble or fluid ball is primarily determined by the external conditions such as the velocity and density differential between the primary and secondary streams, associated with the flow. Experiment has shown that the burble or fluid ball size decreases at higher velocities and increases with distance downstream of the exhaust outlet 24.

It will be seen that, because the formation of these burbles or fluid balls in the turbulent region of the jet exhaust is the primary cause for bothersome subsonic jet noises, jet noise abatement means must control and prevent the formation of these eddies or burbles.

Applicant's invention relates to the control of the formation of these burbles or eddies and affects this cancellation by causing the primary and secondary streams to pass over vortex generators which induce vortices of opposite rotation and phase so as to cause a cancelling effect on the sound waves produced by the burbles described above as the burbles attempt to pass through the vortex street generated by these vortex generators.

A representation of this cancelling effect is shown in Fig. 6 in which vortex generators 40 and 42 are placed on the outer and inner periphery respectively of exhaust outlet 24 of tail pipe 22. Vortices $s$ represent the vortices generated by vortex generator 40, while vortices $p$ represent the vortices of opposite direction and phase generated by vortex generator 42. It will be noted that as the burbles or large eddies attempt to be formed, as was shown in Fig. 5, the movement of the burble formation line $l$ is opposed by the cancelling vortices $s$ and $p$. As burble generating line $l$ attempts to move upward, it is intercepted and cancelled by vortices $s$ and when it attempts to move downward, it is intercepted and cancelled by vortices $p$ so that no burble comparable to burble 80 of Fig. 5 can be formed. Since a plurality of burbles such as 80 are the main noise generating media in a jet engine exhaust, the prevention of their formation represents the abatement of their noise.

In addition to preventing the formation of the burbles as described above, the turbulence created by the vortices formed by vortex generators 42 and 40 causes a greater initial mixing between the primary stream and the secondary stream than would ordinarily occur so that the temperature of the primary stream is dissipated more quickly, thereby leaving a lesser quantity of thermal energy to be converted into acoustical energy downstream.

It will be obvious that the size and phase and direction of the vortices generated by the vortex generators 42 and 40 will be dependent upon the size of the vortex generators as well as the velocity of the primary and secondary streams. Applicant desires to create vortices having a definite frequency, which frequency will be so related to the pulsations in the primary stream that the most effective noise abatement configuration will be made available.

The vortex generators described to this point are of the ring type and of substantially semi-circular cross section and vortex generator 40 is attached to the outer periphery of exhaust outlet 24 by any convenient means, whether machined from the same raw material, welded or some type of mechanical attachment. In the same fashion, ring type vortex generator 42 of semi-circular cross section is attached to the inner periphery of exhaust outlet 24 in any convenient manner, possibly in one of the manners just described. This construction is shown in greater detail in Fig. 8 in which vortex generators 40 and 42 are attached to the outer and inner periphery respectively of exhaust outlet 24 of tail pipe 22. It should be obvious that instead of tail pipe 22, the vortex generators 40 and 42 could be attached to the exhaust outlet 24' of afterburner 50 as shown in Fig. 2. Referring again to Fig. 8, we see that primary stream, at velocity $U_p$, passes through tail pipe 22 and is exhausted to the atmosphere through exhaust outlet 24. The secondary stream, at velocity $U_s$, passes through the passage formed by shroud or nacelle 26 and engine configuration 10. It will be noted that the secondary stream passes over vortex generator 40 while the primary stream passes over vortex generator 42.

Fig. 9 is a rear view of the construction shown in Fig. 10 for purposes of clarification.

Now, referring to Fig. 15, we see vortex generator 40 of ring type construction and semi-circular cross section. We further see vortex generator 42. The former is attached to the outer periphery of exhaust outlet 24 while the latter is attached to the inner periphery of exhaust outlet 24. The diameter of vortex generator 40 is designated as $d_s$ while the diameter of vortex generator 42 is designated as $d_p$. We further see that the secondary stream approaches vortex generator 40 at free stream velocity $U\infty_s$ while the primary stream approaches vortex generator 42 at free stream velocity $U\infty_p$. After passing over the vortex generators, the separation velocities of the primary stream and the secondary stream are represented by $U_{sp}$ and $U_{ss}$, respectively. It will be noted that inwardly directed rotating vortices $s$ are formed by vortex generator 40 while outwardly rotating vortices $p$ are generated by vortex generator 42. It will be noted further that vortices $s$ and $p$ are out of phase so as to form a stationary and stable vortex street, shown in Fig. 15 and represented by the plurality of vortices $s$ and $p$ in the formulation shown. Because vortex generators 40 and 42 are of the ring type and because exhaust outlet 24 is circular in cross section, the vortex street formed by the plurality of vortices $s$ and $p$, called a vortex street, will also be cylindrical in shape, thereby imprisoning the primary jet burbles within its cylindrical confines and preventing the penetration of the vortex street by the primary jet burbles in a sound wave cancellation function. In addition, as described previously, this vortex street prevents and governs the formation of the large burbles at the outer periphery of the primary jet stream, as shown in Fig. 6. In this connection and with reference to Fig. 6 and Fig. 8, it will be seen that the cylinder of vortices created by the outwardly projecting vortex generator 40 envelops and is concentric with the cylinder of vortices created by inwardly projecting vortex generator 42. Further the vortices created by vortex generator 40 are of opposite rotation and phase from the vortices created by vortex generator 42.

It is accepted that each vortex has a given strength called "circulation" which is usually noted by the Greek letter $\Gamma$. As shown in Fig. 15, a vortex street has many individual vortices per unit length. Each individual vortex has a certain strength or circulation and the total strength of all the vortices in a given length is called "circulation per unit length." Assuming a shear layer as indicated in Fig. 15, the circulation per unit length is $U_s$ and the average velocity is ½ $U_s$, so that the rate at which circulation is transported downstream is ½ $U_s^2$. In the vortex street, where the vorticity is concentrated into individual vortices, each having circulation $\Gamma$, the rate of transport of circulation in each row is $n\Gamma$, where $n$ is the shedding frequency. The shedding frequency, $n$, is the number of vortices formed behind a vortex generator per unit time. According to experimental observations, the rate of transport of circulation in each row $n\Gamma$, is only a fraction, $\epsilon$, of the transport along the sheer layer; from this, we can set up formula $$n\Gamma = \epsilon U_s^2/2 = \epsilon K^2 U\infty^2/2$$

where $n$ = shedding frequency
$\Gamma$ = circulation per vortex
$\epsilon$ = fraction of sheer layer vorticity which goes into individual vortices
$U\infty$ = free stream velocity
$U_s$ = velocity on free stream line at separation
$K$ = base pressure parameter ($U_s/U\infty = K$)

If the velocity of the primary stream is greater than the velocity of the secondary stream, the circulation around the semi-circular cylinder inserted in the secondary stream should be increased in order to compensate for smaller secondary velocity and to obtain a stable vortex street. This can be accomplished by increasing the diameter $d_s$ shown in Fig. 15.

Now, referring to Fig. 16, we see a diagrammatic representation of the formation of a vortex. Semi-circular vortex generator 40 is shown attached to any surface, possibly tail pipe 22. Air is passed over the semi-circular vortex generator 40 at velocity U in the fashion shown by stream lines 80. Directly above vortex generator 40 a velocity profile is shown in which gas or air at velocity U exists at the upper portion of the profile and complete stagnation occurs at its lower portion. The boundary layer formed about semi-circular vortex generator 40 is shown at 82.

Still referring to Fig. 16, we should bear in mind that real fluids have viscosity producing tangential stresses in a moving fluid. The surfaces over which the fluid flows from the stationary boundaries where the fluid velocity is 0, as a consequence of viscosity. This is shown by our velocity profile in Fig. 16. Vortex generation as air or a gas passes over a bluff obstacle is based on these two independent facts. A fluid having a velocity U approaching an obstacle 40 reacts in the following manner:

At the surface of the obstacle, the velocity of the fluid is 0 but a short distance from the surface the velocity is U. The velocity gradient is therefore high and gives rise to tangential stresses. The layer of retarded fluid continues to grow as one travels along the obstacle due to the increasing tangential stresses. A thin boundary layer of fluid adjacent to the obstacle surface is acted upon by three forces:

(a) Friction force at the obstacle surface.
(b) Forward force of the layer above.
(c) Force function of pressure grading along the surface.

With this combination of forces acting on it, this layer will be brought to rest when the forces governed by pressure gradients and the surface friction force equal the forward force of the top layer. And when this force is exceeded, a reversal of velocity occurs and vorticity results. The position for this reversal for simple obstacles has been calculated and experimentally verified. The vortex 84 continues to grow and finally breaks away from the surface and travels downstream with the fluid.

The frequency at which these vortices are shed has been formulated for cylinders as follows:

$$\frac{nd}{U} = .198\left(\frac{1-19.7}{R}\right)$$

where:

$n$ = shedding frequency
$d$ = diameter of vortex generator
$U$ = free stream velocity
$R$ = Reynolds number based on $d$ The formation of vortices downstream of a cylindrical body 86 is shown in Fig. 17 where air or gas approaches cylindrical body 86 at velocity U and induces clockwise rotating vortices X and counterclockwise rotating vortices Y. Vortices X and Y are representative of the vortices pattern or vortex street which will be established by semi-circular vortex generators 40 and 42 as shown in Fig. 15.

While applicant has devoted most of the descriptive material in this paper to the description of the action of ring type semi-circular vortex generators, it should be borne in mind that a desirable vortex street may also be generated by use of flat plate, flange type, or airfoil shaped vortex generators.

Referring to Fig. 10, we see a primary stream being passed through tail pipe 22 at velocity $U_p$ and thence discharged into atmosphere through exhaust outlet 24. We also see shroud or nacelle 26 surrounding and enveloping in coaxial fashion tail pipe 22 and engine 10. The secondary stream passes through the passage formed by shroud or nacelle 26 and engine 10 and is exhausted to atmosphere through secondary exhaust outlet 28. The secondary stream at velocity $U_s$ passes across a flat plate or airfoil shaped vortex generators 40″ while the primary stream at velocity $U_p$ passes across plate type or airfoil shaped vortex generators 42″. A perspective view of these vortex generators is shown in Fig. 11. It will be obvious that vortex generators 40″ and 42″ can be either of flat plate construction or airfoil shaped and set at an angle to the center line of engine 10 as they project radially inward and outward from exhaust outlet 24. Vortex generators of this type should preferably be used in a series or plurality of pairs. If generators of the flat plate type are used, the adjacent plates of each pair should converge at their downstream end. If airfoil shaped as shown, adjacent generators 110 and 112 form one of many generator pairs and are of opposite shaped airfoil so as to generate vortices of opposite rotation. This pairing preference applies to both the primary and secondary streams vortex generators. The vortex generators formed in this fashion will form a vortex street of both inwardly and outwardly directed rotating vortices by the air which passes over the outer tip 90 and 92 or as circumferentially rotating, in two directions, vortices induced by the passage of the primary and secondary streams between adjacent vortex generators 42″ and 40″.

Further, a similar vortex street will be formed by the vortex generator construction shown in Figs. 13 and 14. Referring to Fig. 13, we see an outwardly directed flange type vortex generator 40‴ which may either be a one-piece cylindrical flange or a plurality of flange segments at varying planes with respect to the plane in which exhaust outlet 24 lies, but in each instance, each flange segment 114 and 116 probably forms an angle greater than 90° with respect to the engine center line, which angle beginning on the engine center line in the forward end of the engine and intersects the flange segment plane. Similar vortex generators 42‴ are directed inward. It will be noted that when vortex generators of the flange type but in multi-plane sections are used, a separation 98 and 100 is provided between adjacent flaps or vortex generator or flange segments, this separation will produce a circumferentially rotating (in two directions) plurality of vortices which will combine with the radially inward rotating vortices formed by the upper surfaces 102 and 104 of vortex generators 40‴ and 42‴. It will be noted that this is the same type of vortex street which will be generated by the configuration shown in Figs. 10 and 11. It will be noted that in the configurations shown in Figs. 10 and 11 and Figs. 13 and 14, the size, shape and spacing of the vortex generators will be chosen to provide the most stable vortex street when used with the particular primary and secondary stream velocities.

Referring now to Fig. 12, we see a further variation of my invention in which vortex generators 40″″ and 42″″ are of tear or airfoil shape in cross section so as to permit a more gradual build-up of the boundary layer as opposed to boundary layer buildup shown on a semi-cylindrical vortex generator in Fig. 16. In this instance, the primary jet stream at velocity U passes over the tear shaped vortex generator 42″″ while the secondary stream at velocity $U_s$ passes over tear shaped vortex generator 40″″. It will be noted that the elongated tear section is at the forward end of these vortex generators and that the after end is substantially semi-circular in cross section. Each vortex generator ring of this type consists primarily of semi-circular sections 120 and 122, with blending fillets 124 and 126.

Under proper conditions of primary and secondary stream velocity and the pulsations within the primary stream, any of the vortex generator units described, such as 40 and 42, can be used singly and not in conjunction with one another.

It is to be understood that the invention is not limited to the specific embodiment herein illustrated and described, but may be used in other ways without departure from its spirit as defined by the following claims.

I claim:

1. In combination, an aircraft jet engine having a tail pipe at the downstream end thereof defining a primary conduit and with a circular exhaust outlet through which said engine discharges exhaust gas to atmosphere, a shroud coaxial with and encircling said engine and forming a secondary conduit with said tail pipe and having a circular exhaust outlet upstream of said exhaust outlet of said tail pipe, a vortex generator in the form of a continuous flange encircling the periphery of said tail pipe exhaust outlet and projecting radially outwardly therefrom into said secondary conduit, a vortex generator in the form of a continuous flange encircling the periphery of said tail pipe exhaust outlet and located directly inboard of said outwardly extending vortex generator flange and projecting radially inwardly therefrom into said primary conduit to form a first cylinder of vortices as said exhaust gas passes thereover, means to pass gas through said secondary conduit and over said outwardly projecting vortex generator at a selected velocity with respect to said exhaust gas velocity to form a second cylinder of vortices of opposite phase and rotational direction to said first cylinder; said cylinders coacting to form an acoustic barrier in the form of a stable, cylindrical vortex street enveloping the gases discharged from said primary conduit.

2. In combination, an aircraft jet engine having a tail pipe at the downstream end thereof defining a primary conduit and with a circular exhaust outlet through which said engine discharges exhaust gas to atmosphere, a shroud coaxial with and encircling said engine and forming a secondary conduit with said tail pipe and having a circular exhaust outlet upstream of said exhaust outlet of said tail pipe, a first continuous ring type vortex generator of semi-circular cross section encircling the outer periphery of said tail pipe exhaust outlet and projecting radially outwardly therefrom into said secondary conduit, a second continuous ring type vortex generator of semi-circular cross section positioned radially inboard of said first vortex generator and encircling the inner periphery of said tail pipe exhaust outlet and projecting radially inwardly therefrom into said primary conduit to form a first cylinder of vortices as said exhaust gas passes thereover, means to pass gas through said secondary conduit and over said outwardly projecting vortex generator at a selected velocity with respect to said exhaust gas velocity to form a second cylinder of vortices of opposite phase and rotational direction to said first cylinder; said cylinders coacting to form an acoustic barrier in the form of a stable, cylindrical vortex street enveloping the gases discharged from said primary conduit.

3. An exhaust silencer comprising a main conduit defining a first fluid passage having an axis and an exhaust outlet, a secondary conduit coaxial with and surrounding said main conduit and defining a second fluid passage therebetween having an exhaust outlet, a vortex generator in the form of a continuous ring encircling the periphery of said main conduit exhaust outlet and projecting outwardly therefrom, a vortex generator in the form of a continuous ring encircling the periphery of said main conduit exhaust outlet and located directly inboard of said outwardly extending vortex generator ring and projecting inwardly therefrom into said first fluid passage, means to pass gas through said first fluid passage and over said inwardly projecting vortex generator thereby forming a first continuous series of counterclockwise rotating vortices downstream thereof in the shape of said first passage exhaust outlet, means to pass gas through said second fluid passage and over said outwardly projecting vortex generator at selected velocity to form a second continuous series of vortices downstream thereof in the shape of said first passage exhaust outlet and of opposite phase and rotational direction to and concentric with said first series of vortices and coacting therewith to form an acoustic barrier in the form of a stationary cylindrical vortex street in the cross-sectional shape of said first passage exhaust outlet.

References Cited in the file of this patent

UNITED STATES PATENTS

| 1,790,375 | Hemerka | Jan. 27, 1931 |
| 2,650,752 | Noadley | Sept. 1, 1953 |

FOREIGN PATENTS

| 162,195 | Australia | Mar. 25, 1955 |
| 165,369 | Australia | Sept. 26, 1955 |
| 704,669 | Great Britain | Feb. 24, 1954 |